Nov. 6, 1962    H. W. FRENCH, JR    3,062,099
STEREOSCOPIC ATTACHMENT FOR VIEWERS
Filed Feb. 12, 1959
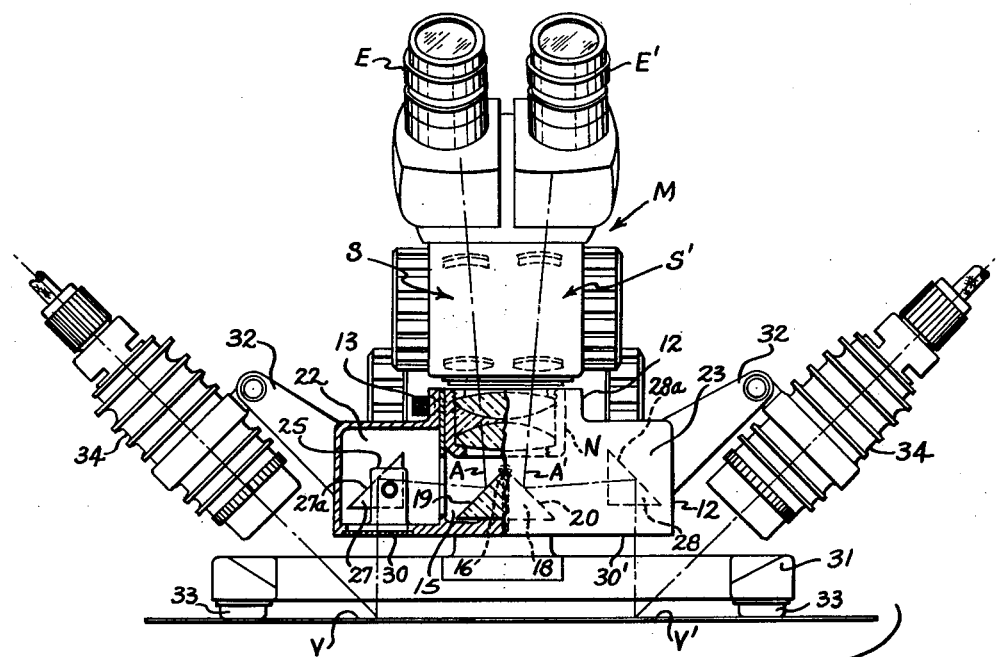
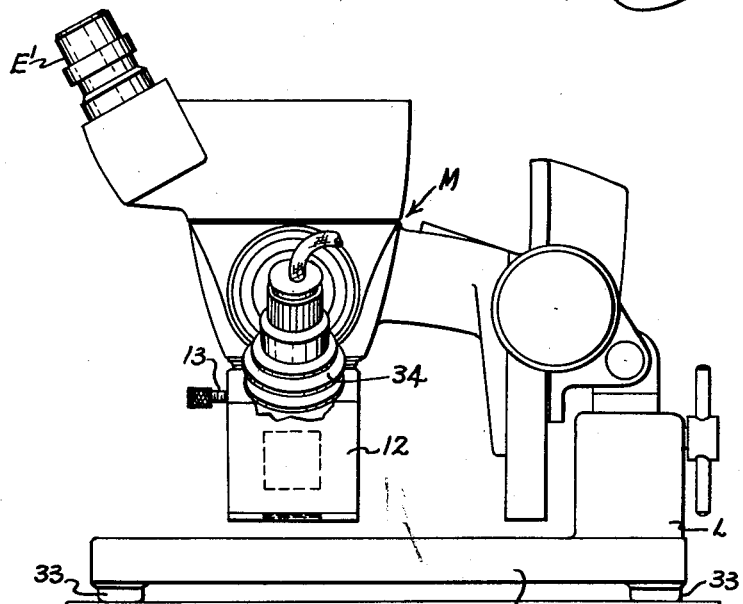
INVENTOR
HOBERT W. FRENCH, JR.
BY Herbert C. Kimball
ATTORNEY United States Patent Office 3,062,099
Patented Nov. 6, 1962

3,062,099
STEREOSCOPIC ATTACHMENT FOR VIEWERS
Hobert W. French, Jr., Colden, N.Y., assignor to American Optical Company, Southbridge, Mass., a voluntary association of Massachusetts
Filed Feb. 12, 1959, Ser. No. 792,818
2 Claims. (Cl. 88—40)

This invention relates to apparatus for adapting a stereoscopic microscope to the stereoscopic observation of relatively large views, and more particularly aerial photographs for the purpose of mapping, contouring, determination of geological formations and kindred purposes.

The observation of such relatively large views always presents to some degree the problem of adequate separation between the two optical axes which are inherent in a stereoscopic system; however, so long as moderate magnification is satisfactory, two optical systems for imaging the two views in the respective eyes of the observer may be custom made following recognized optical principles. To provide highly magnified images commensurate with the power of a microscope would be so expensive as to warrant such detail viewing only in exceptional circumstances. I have found that it is not necessary, for work under high magnification, to resort to custom built microscopes; and that apparatus made in accordance with my invention may be used for adapting to this purpose a stereoscopic microscope which affords an adequate working distance.

Stereoscopic microscopes are available commercially which provide the considerable flat field of view and the adequate working distance which the above considerations call for. Since stereoscopic microscopes provide highly magnified images which reveal small details of the object under observation, they are well suited to observation of aerial photographs and the like except that the two optical axes, one for each eye, converge toward a common point in the object plane of the microscope, that is the plane upon which the two optical systems, one for each eye, are focused. It is the purpose of this invention to provide simple and accurately functioning apparatus which, when applied to a known and commercially available microscope of this type, will adapt the microscope to the observation not of a single object but of two substantially separated views such as aerial photographs. It is essential therefore that the apparatus shall function so that the one photograph be seen through the microscope with one eye and that the other photograph of the spaced pair be seen through the microscope with the other eye, this without costly alteration of the commercially available microscope.

Referring to the drawings which illustrate the invention:

FIG. 1 is a view, principally in front elevation, of a stereoscopic microscope adapted by apparatus embodying my invention to the viewing of substantially separated views. A portion of the housing for the reflecting means is broken away to reveal the reflecting surfaces;

FIG. 2 is a side view of the microscope and adapting apparatus shown in FIG. 1.

In these drawings the stereoscopic microscope is indicated by the letter M. As above pointed out, the purpose of the present invention is to provide apparatus for adapting a commercially available microscope to the examination of the pairs V and V' of aerial photographs or the like. It is not the purpose to modify such microscope. The latter has at E and E' the usual pair of eyepieces through which the two highly magnified images produced by the two optical systems S and S' are viewed by the two eyes of the observer. The optical axes of these two optical systems are represented in broken lines at A and A', it being indicated in FIG. 1 that these optical systems are designed for a working distance which places the object plane at P. In other words, the optical axes A and A' converge at such an angle as to meet in the object plane P.

To the nosepiece N of this microscope is fixed the housing 12 of my adapting apparatus, screws for this purpose being shown at 13. The housing 12 has a central chamber 15 on the floor of which is secured by a screw 16 a central member 18 common to the two reflecting systems which displace the optical axes A and A' outwardly in opposite directions and then render these axes A and A' parallel so as to direct them perpendicularly to the photographs or the like V and V'. For the purpose of outwardly displacing these axes the central member 18 is provided with oppositely inclined reflecting surfaces 19 and 20. The member 18 may be made of glass and provided with front surface mirrors for the surfaces 19 and 20. As will be apparent from FIG. 1 the central member 18 is below the optical systems S and S' but sufficiently elevated above the plane P so that the photographs V and V' will be in focus allowing for the lateral displacement of the optical axes.

The housing 12 has in addition two lateral chambers 22 and 23 each of which has an adjustable mounting 25 for a reflecting prism 27, 28 respectively. The prism 27 has a mirror surface 27$^a$ and the prism 28 has a mirror surface 28$^a$, and these mirror surfaces render the axes A and A' parallel and perpendicular to the views V and V'.

Accordingly there are two similar reflecting systems for first displacing the optical axes outwardly and then rendering them parallel. One system is made up of the reflecting surfaces 19 and 27$^a$ and cooperates with one eyepiece E; and the other system is made up of the reflecting surfaces 20 and 28$^a$ and cooperates with the other eyepiece E'.

The housing 12 is provided with windows 30 and 30' where the optical axes pass through the bottoms of the chambers 22 and 23. From the outer wall of each of these chambers extends an arm 32 for pivotally mounting an illuminator 34 whose light may be directed on the respective view V or V'. In order to space the housing 12 and more particularly the windows 30 and 30' from the support for the views V and V' pedestal L of the microscope is provided with a U-shaped base 31 which extends forwardly below the housing 12. Resilient pads 33 on the bottom of this base 31 engage the foregoing support or the views V and V' resting thereon.

It will be seen, therefore, that by the interposition of the member 18 in the path of the converging axes A and A' the latter are displaced a sufficient distance apart so that views, such as aerial photographs which are relatively large, may be viewed stereoscopically with a microscope without requiring expensive alteration in the optical systems of the microscope. This result is attained through apparatus used as an attachment for a microscope which has the normal uses of a stereoscopic microscope.

I claim:
1. The combination with a stereoscopic microscope having two eyepieces, a nosepiece, a common objective in said nosepiece, and two optical systems each extending from the common objective in said nosepiece to one of said eyepieces for producing with respect to an object in the common object plane of said optical systems two highly magnified images, one for each eye of the observer, said object plane being substantially spaced from said objective to afford adequate working distance for stereoscopic observation of relatively large views, and means for positioning said views in the effective object plane of said microscope, of a self-contained stereoscopic viewer comprising a housing adapted to be secured to and carried by said nosepiece so as to be in fixed relation to the optical systems of said microscope, said housing having a central and two lateral chambers, one on each side of said central chamber, a central reflecting member mounted in said central chamber immediately below said common objective, said central member having oppositely inclined reflecting surfaces for displacing said converging optical axes outwardly, two reflector members, one mounted in each of said lateral chambers for rendering said outwardly displaced axes parallel, said stereoscopic viewer being supported solely by said nosepiece when attached thereto.

2. A viewing attachment for use with a stereoscopic microscope of relatively high magnification and of the type employing a single nosepiece and single objective as well as a pair of laterally spaced optical systems, one for each eye of the observer, with the respective optical axes of said systems in such optical alignment with different portions of said single objective and in such predetermined converging angular relation to each other as to meet at a single point in the common object plane of said systems, said attachment enabling the viewing of relatively large views stereoscopically through said microscope and comprising a housing having a central opening formed in an upper wall thereof, a collar surrounding said opening and of such size as to fit closely about the nosepiece of said microscope, means carried by said collar for releasably securing said housing in a fixed operative position upon said nosepiece, whereby said attachment will move as a unit with said microscope during focusing adjustment thereof, said housing providing a chamber for receiving a stereoscopic reflecting system including a central unitary optical member and a pair of spaced reflecting members disposed at opposite sides thereof, said central unitary member having a pair of oppositely inclined mirror-like reflecting surfaces thereon in closely adjacent angular relation to each other, means in said housing for supporting and securing said central unitary member in a fixed operative position beneath and closely adjacent said microscope objective and nosepiece, said inclined mirror-like surfaces being disposed so as to intercept and direct said converging optical axes of said systems outwardly in opposite directions toward said spaced reflecting members, an opening in the bottom wall of said housing beneath each reflecting member, and means in said housing for supporting said spaced reflecting members with their reflecting surfaces in optical alignment with the outwardly directed portions of said optical axes, said last-named means supporting said spaced reflecting members in positions for directing said optical axes downwardly through said bottom openings and outwardly from said housing in parallel relation to each other, the location of each reflecting member in said housing relative to the bottom opening aligned therewith and relative to said central unitary member being so controlled that the total distance along each optical axis from said objective to each bottom opening will be less than the predetermined working distance of said single objective by an amount sufficient to allow normal focusing adjustment of said microscope when said attachment is in position thereon.

References Cited in the file of this patent
UNITED STATES PATENTS

| | | |
|---|---|---|
| 1,501,059 | Metz | July 15, 1924 |
| 2,352,570 | Seely | June 27, 1944 |
| 2,413,996 | Ramsdell | Jan. 7, 1947 |
| 2,555,106 | Beazley | May 29, 1951 |
| 2,803,992 | Baboz | Aug. 27, 1957 |
| 2,901,942 | Tackaberry | Sept. 1, 1959 |

FOREIGN PATENTS

| | | |
|---|---|---|
| 5,600 | Australia | Sept. 27, 1932 |
| 598,030 | France | Sept. 16, 1925 |
| 717,129 | Germany | Feb. 6, 1942 |